United States Patent
Maras

(10) Patent No.: US 6,814,157 B2
(45) Date of Patent: Nov. 9, 2004

(54) ROTARY TOOL FLEX SHAFT WITH LOCK PIN AND END CAP

(75) Inventor: Verica Maras, Schaumburg, IL (US)

(73) Assignee: Credo Technology Corporation, Wilmington, DE (US)

( * ) Notice: Subject to any disclaimer, the term of this patent is extended or adjusted under 35 U.S.C. 154(b) by 108 days.

(21) Appl. No.: 10/080,088

(22) Filed: Feb. 21, 2002

(65) Prior Publication Data
US 2003/0155141 A1 Aug. 21, 2003

(51) Int. Cl.[7] .............................................. B25D 17/08
(52) U.S. Cl. ........................ 173/171; 173/29; 433/112; 433/114; 30/273
(58) Field of Search .............................. 30/273, 275.4, 30/277.4, 296.1; 433/112, 114; 173/29, 171; 227/19

(56) References Cited

U.S. PATENT DOCUMENTS

| | | | |
|---|---|---|---|
| 449,068 A | * | 3/1891 | Campbell .................. 433/112 |
| 1,324,787 A | | 12/1919 | Berge |
| 1,595,388 A | | 8/1926 | Elliott |
| 2,008,894 A | | 7/1935 | Bergstrom |
| 2,377,271 A | * | 5/1945 | Schumann .................. 433/112 |
| 2,536,017 A | | 1/1951 | Bamberger |
| 2,618,940 A | * | 11/1952 | Wyzenbeek .................. 433/112 |
| 2,840,673 A | | 6/1958 | Burton |
| 3,372,560 A | * | 3/1968 | Dalton ........................ 433/112 |
| 3,488,850 A | * | 1/1970 | Lieb ............................ 433/114 |
| 3,505,831 A | * | 4/1970 | Palmer ........................ 464/53 |
| 3,686,896 A | | 8/1972 | Rutter ............................ 64/4 |
| 4,185,474 A | * | 1/1980 | Kulischenko ............... 433/112 |
| 4,317,578 A | * | 3/1982 | Welch .......................... 279/60 |
| 5,496,139 A | * | 3/1996 | Ghode et al. ............... 409/182 |

\* cited by examiner

*Primary Examiner*—Stephen F. Gerrity
*Assistant Examiner*—Michelle Lopez
(74) *Attorney, Agent, or Firm*—Greer, Burns & Crain, Ltd.

(57) ABSTRACT

A handpiece for a rotary tool including a flexible power shaft configured for connection at one end to the rotary tool, and at the other end to the handpiece, with at least one locking formation affixed to the shaft. The handpiece includes a housing having a first end for receiving the shaft, and a second end configured for accommodating a working attachment, the housing defining a central throughbore for rotatably receiving the shaft. At least one locking actuator is disposed in the housing for releasable engagement with the locking formation, the handpiece being provided with a biasing force for biasing the actuator out of engagement with the locking formation, so that a user-applied force on the actuator overcomes the biasing force to enable locking engagement between the actuator and the locking formation. A working end of the handpiece housing has an endcap and is also configured for receiving supplemental attachments.

14 Claims, 3 Drawing Sheets

ROTARY TOOL FLEX SHAFT WITH LOCK PIN AND END CAP

BACKGROUND OF THE INVENTION

The present invention relates to flexible shaft attachments used with rotary power tools accommodating bits such as small drills, sanders, polishers, grinders, engravers, saws and the like, and specifically to a handset for such a tool which is disposed at a working end of the flexible shaft.

Flexible power transmission shafts are known for use in driving tethered handpieces that are connected to rotary power tools. Through the connection to the flexible shaft, such handsets provide a user with enhanced maneuverability and facilitate manipulation of the working end of the tool. The user can more easily access difficult-to-reach or delicate workpieces to perform drilling, sanding, grinding, polishing, cutting, engraving or similar operations.

One drawback of conventional handpieces is that they are configured for receiving only the bit or working attachment. Thus, while providing finger-tip control, a disadvantage of this arrangement is that operations which require precise or straight-line movement of the tool are difficult to satisfactorily perform, due to the normal instability of hand-held units. Conventional handpieces lack fittings or formations for receiving guide attachments for maintaining the position of the handpiece relative to the workpiece.

Another drawback of conventional handpieces occurs when locking the bit or working attachment to the handpiece. Typically, a collet nut is used to clamp the shaft of the bit in a socket at the end of the flexible drive shaft. The collet nut is threaded upon the drive shaft end. However, since the flexible drive shaft is rotatable within its sheath, it is difficult to lock the collet nut in place to withstand the high speed rotation and vibration of the rotary tool. To address this problem, conventional handpieces employ a locking aperture in the handpiece which is in registry with a throughbore near the end of the flexible drive shaft. A thin elongate rod, such as a shaft of a bit, must be inserted through the locking aperture and into the throughbore to prevent the drive shaft from rotating relative to the handpiece. This operation is awkward and time consuming to perform.

Thus, a first object of the present invention is to provide an improved handpiece for a rotary tool flexible shaft attachment which features the ability to receive supplemental attachments such as guides, in addition to the conventional bits or working attachments.

Another object of the present invention is to provide an improved handpiece for a rotary tool flexible shaft attachment which features an easily actuable shaft lock for facilitating the attachment and removal of bits.

BRIEF SUMMARY OF THE INVENTION

The above-listed objects are met or exceeded by the present rotary tool flex shaft with a handpiece featuring a working end of the housing which is configured for receiving supplemental attachments such as guides, in addition to the working attachment or bit. Another feature of the present handpiece is a built-in locking button which is easily actuated by the user with the same hand used to hold the handpiece. Thus, the other hand can be used to easily remove and replace the working attachment, which will be securely locked to the flexible shaft.

More specifically, the present invention provides a handpiece for a rotary tool including a flexible power transmission shaft configured for connection at one end to the rotary tool, and at the other end to the handpiece, with at least one locking formation affixed to the shaft. The handpiece includes a housing having a first end for receiving the shaft, and a second end configured for accommodating a working attachment, the housing defining a central throughbore for rotatably receiving the shaft. At least one locking actuator is disposed in the housing for releasable engagement with the locking formation, the handpiece is provided with a biasing force for biasing the actuator out of engagement with the locking formation, so that a preferably radially-directed user-applied force on the actuator overcomes the biasing force to enable locking engagement between the actuator and the locking formation. A working end of the handpiece housing is also configured for receiving supplemental attachments.

In another embodiment, a handpiece for a rotary tool includes a flexible power transmission shaft configured for connection at one end to the rotary tool, and at the other end to the handpiece. The handpiece includes a housing having a first end for receiving the power transmission shaft, and a second end configured for accommodating a working attachment. The housing defines a central throughbore for rotatably receiving at least a portion of the flexible shaft. An attachment formation located at the second end is configured for receiving an endcap, the endcap is configured for engagement upon the attachment formation, and preferably has a flared outer end. The endcap is removable to provide a location for accommodating supplemental attachments such as guides.

DETAILED DESCRIPTION OF THE INVENTION

Figure 1:
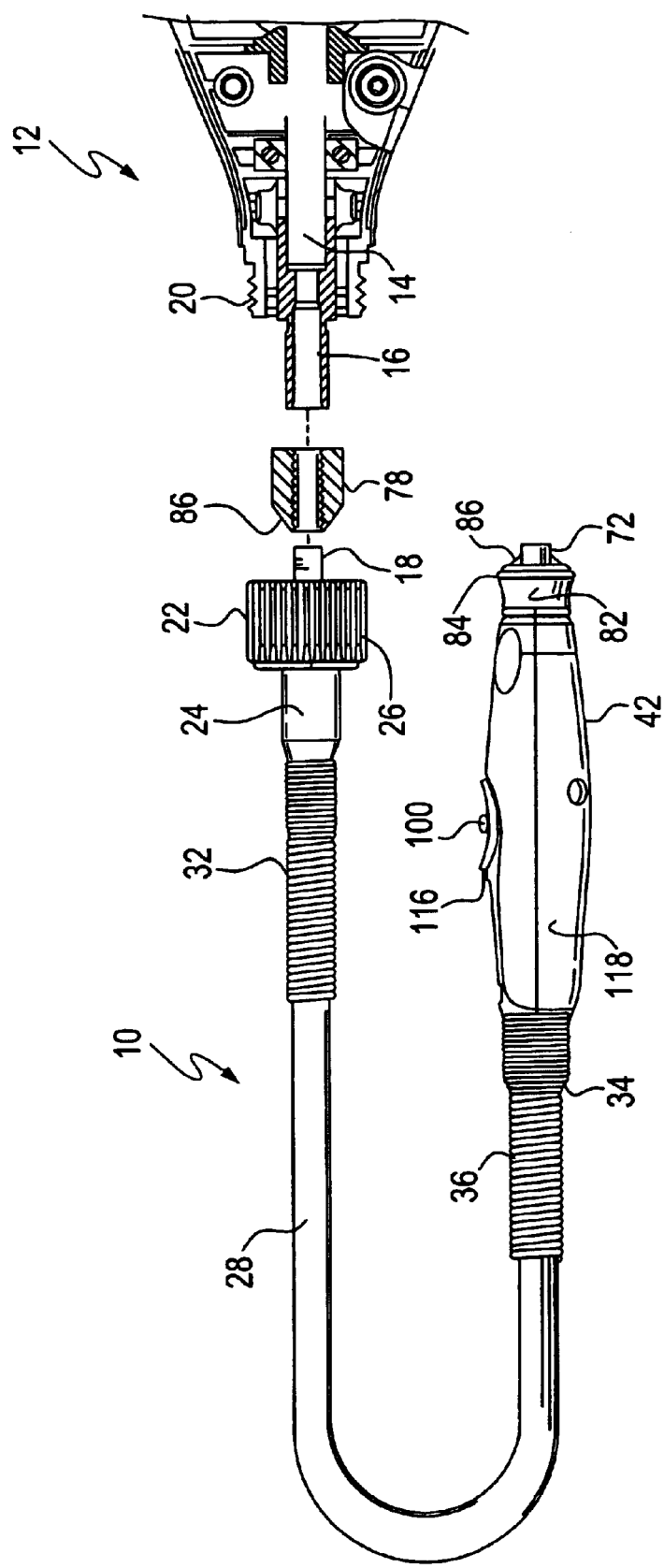
FIG. 1 is a side elevational view of the present handpiece shown connected to a rotary tool flexible power transmission shaft with a suitable tool shown in section.
Figures 2, 3:
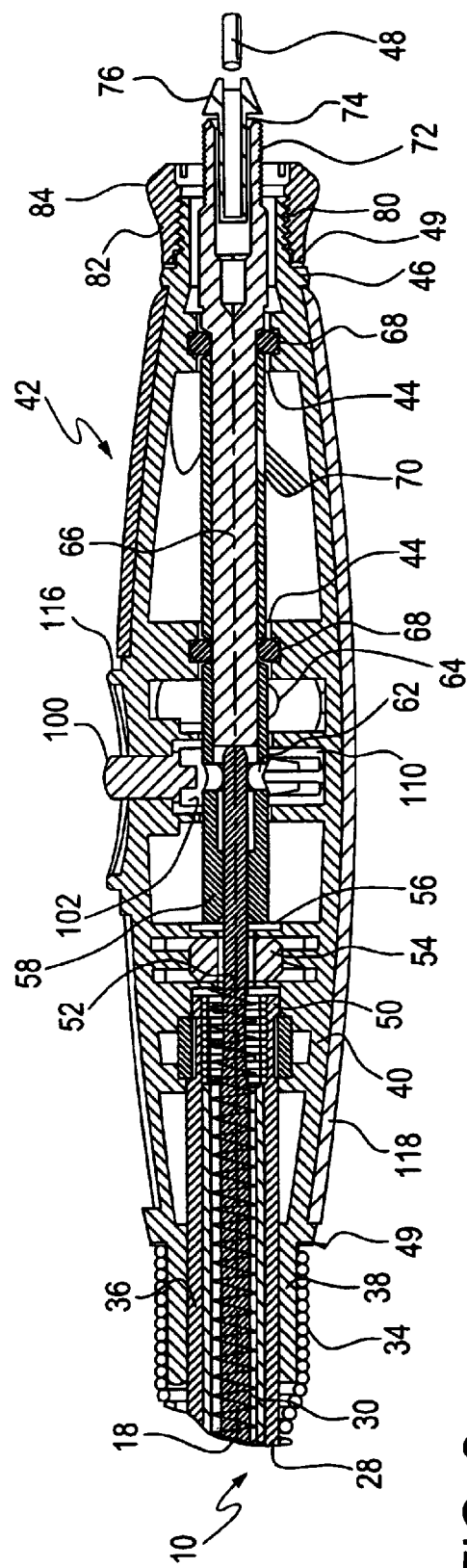
FIG. 2 is a cross-section taken along the line 2—2 of FIG. 1 and in the direction indicated generally.
FIG. 3 is a cross-section taken along the line 3—3 of FIG. 1 and in the direction indicated generally.

Referring now to FIGS. 1 and 2, a flexible drive transmission shaft suitable for use with the present invention is generally designated 10, and is designed for use with a rotary tool, generally designated 12. The rotary tool 12 is preferably a hand-held, electric tool of the type sold under the trademark DREMEL® by the present assignee, as well as similar competing tools. As is well known in the art, the tool 12 has an internal electric motor (not shown) which provides a source of rotary power for the flexible shaft 10. The motor is coupled to an axially-oriented drive shaft 14 having a noncircular recess 16 configured for matingly receiving a noncircular and preferably square or rectangular-shaped drive shaft element 18 of the flexible drive shaft 10.

A threaded end 20 of the tool 12 is configured to be coupled to an adapter 22 which is rotatable relative to a connection end 24 of the flexible shaft 10, and has a threaded skirt 26 which threadably engages the threaded end 20. While a threaded connection is preferred for joining the tool 12 and the flexible shaft 10, it is contemplated that other types of fastening connections may be used, including bayonet-type lugs, clips and other repeatable and releasable positive fastening connections.

The basic construction of the flexible shaft 10 is the drive shaft element 18 which is rotatable within, and circumscribed by a sheath or casing 28 with a coil support 30 (best seen in FIG. 2) disposed between the element and the casing. While the drive shaft element 18 is preferably flexible metal, the casing 28 is preferably made of durable, inexpensive, thermoformable plastic material such as polyvinylchloride (PVC). Other suitable materials for these components are contemplated. Coiled, spring-like bend protectors 32, 34 are respectively located at the connection end 24 at a handpiece end 36 of the flexible shaft 10 to protect the flexible element 10 against sharp bends or kinks.

At the handpiece end 36 of the shaft 10, the bend protector 34 engages a first end 38 of a handpiece housing 40 which defines the outer configuration of a handpiece 42. The handpiece housing 40 defines a throughbore 44 which extends to a second or working end 46 which accommodates a working attachment or bit 48, such as, but not restricted to a drill bit, a polishing disk, a grinding wheel, a sanding wheel, a cutting wheel or bit, a wire brush, a saw or other known rotary tool attachment. As is known in the art, the handpiece 42 is designed for enhancing user control of the rotary action of the attachment 48 for delicate and/or difficult to reach operations. As such, the handpiece 42 is easier and lighter to hold than the main rotary tool 12. It is preferred that the handpiece housing 40 be provided in at least two portions which are secured together impart by clips 49.

Referring now to FIG. 2, the throughbore 44 accommodates the handpiece end 36 of the flexible shaft 10, which includes a terminal ends 50, 52 of the casing 28 and the coil support 30. The central or axial flexible drive shaft element 18 protrudes through the ends 50, 52 and is rotatably supported by a guide 54 having an axial bore 56 coaxially aligned with the throughbore 44. A tubular coupling 58 is secured, preferably by being press fit or equivalent secure fastening technology, to a preferably tapered end 60 of the drive shaft element 18. The attachment between the coupling 58 and the drive shaft element 18 is such that the two components rotate together under the working load of the attachment 48.

An important feature of the present handpiece 42 is that the coupling 58 has a locking formation 62 which, in the preferred embodiment, takes the form of a transverse throughbore. While the specific location of the locking formation 62 may vary to suit the application, in the preferred embodiment, it is generally centrally located on the coupling 58. A socket end 64 of the coupling 58 matingly receives, preferably by press-fit, a working end 66 of the flexible shaft 10. Naturally, any positive technique for positively attaching the working end 66 to the coupling 58 is contemplated, provided it can withstand the torque loads generated by the working attachment 48. The working end 66 is supported within the handpiece housing 40 by a pair of axially separated bearing sets 68. Ball bearings, plastic bushings, rollers or other types of friction reducing bearings are contemplated for the bearing sets 68.

A spacer sleeve 70 separates the two bearing sets 68 and circumscribes the working end 66. At its terminal end 72, the working end 66 defines a collet recess 74 configured for receiving a collet 76, which in turn is retained in place about a shank of the attachment 48 by a collet nut 78 (best seen in FIG. 1 with the tool 12) as is known in the art.

Another feature of the present handpiece 42 is that it is provided with an attachment formation 80 at the second or working end 46 which is configured for releasably receiving an endcap 82. While preferably being threadably engageable upon the attachment formation 80, other releasable fastening arrangements are contemplated, including bayonet lugs, clips or the like. In the preferred embodiment, the endcap 82 has a flared outer end 84 which facilitates gripping, however other configurations are contemplated depending on the application.

Aside from providing a gripping point, the endcap 82 is primarily decorative. However, upon removal, it reveals the threaded attachment formation 80, which serves as the place where supplemental attachments are secured to the handpiece 42. In the preferred embodiment, the attachment formation 80 circumscribes the collet 76. The endcap 82 is configured for attachment to the attachment formation 80 so that said an end portion 86 of the collet nut 78 extends past an outer end of said end cap.

Figure 4:
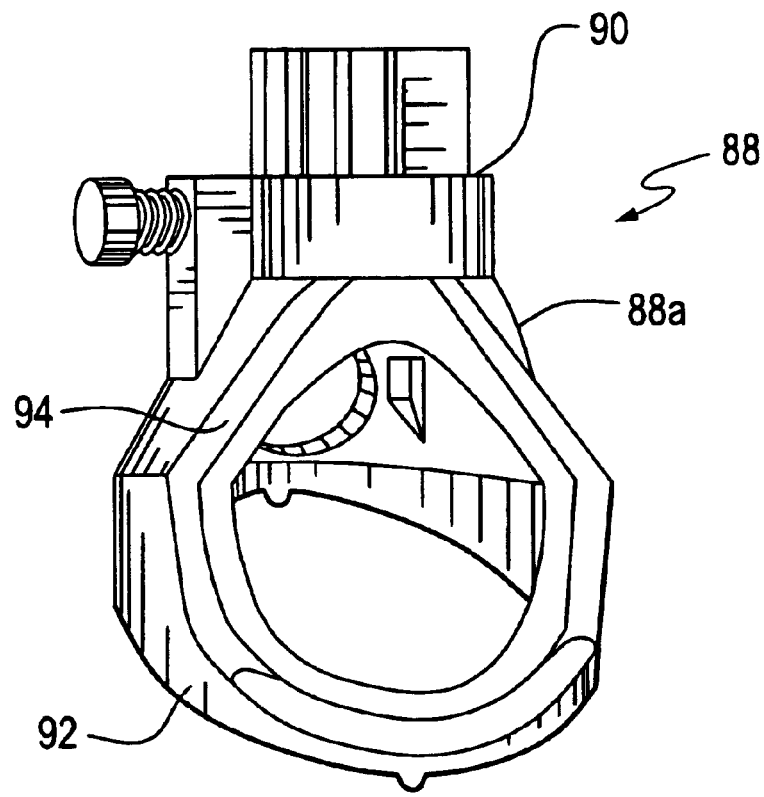
FIG. 4 is an elevational view of a first attachment which is suitable for use with the present handpiece.
Figure 5:
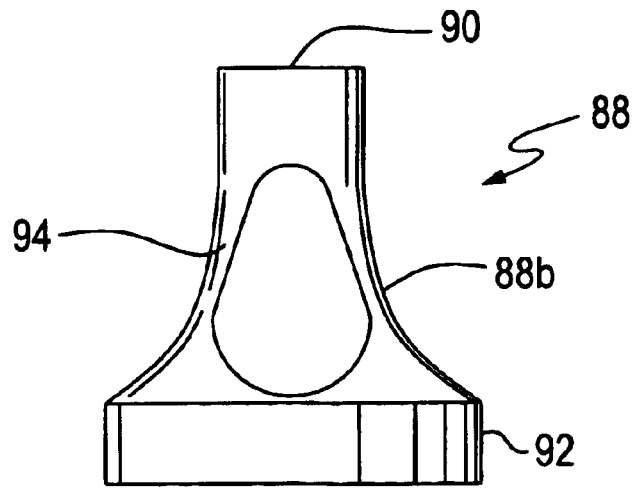
FIG. 5 is an elevational view of a second attachment which is suitable for use with the present handpiece.

Referring now to FIGS. 4 and 5, it is contemplated that any one of a variety of attachments 88 may be connected to the attachment formation 80, including, but not limited to the illustrated surface guides, depth guides, lights, shields or other attachments which may facilitate the use or operation of the handpiece 42. Any suitable attachment 88 will be provided with a threaded bore 90 which engages the attachment formation 80. Specifically, FIG. 4 depicts an angled guide 88a of the type disclosed in commonly-assigned U.S. Pat. No. 6,244,796 B1 which is incorporated by reference. The guide 88a maintains the handpiece 42 at an oblique angle relative to the workpiece or work surface. FIG. 5 depicts an attachment 88b which is configured for maintaining the handpiece 42 in a perpendicular orientation to the workpiece or work surface. A generally circular base 92 of each of the attachments 88a, 88b is configured for sliding engagement along the workpiece or work surface and defines a work area within which the working attachment or bit 48 is operatively disposed. Support members 94 secure the base 92 to the threaded attachment bore 90.

Referring now to FIGS. 2 and 3, still another feature of the present handpiece 42 is that the user can temporarily lock the drive shaft element 18 from rotation with the same hand holding the handpiece. This operation is helpful when exchanging working attachments 48, during which time the collet nut 78 must be loosened to release the attachment. Similarly, when a new attachment 48 is secured in the collet 76, the element 18 should be locked to provide a stable point to which the collet nut 78 can be secured. A secure attachment of the collet nut 78 and the working attachment 48 is desirable to prevent the unwanted or premature loosening of the attachment in the handpiece 42.

The present handpiece 42 provides at least one locking actuator 100 which can be operated by a user with the same hand used to hold the handpiece, for locking the drive shaft element 18 from unwanted axial rotation. The actuator 100 is preferably a single pin or button disposed in the housing 40 for releasable engagement with the respective locking formation 62. An important feature of the actuator 100 is that the user merely depresses the actuator into the housing to lock drive shaft element 18. By virtue of a biasing force preferably provided by a spring 102, the actuator is held out of engagement with the locking formation 62. In the preferred embodiment, the spring 102 is a flat spring formed into a "C"-shape, and defines a gap 104 facing away from the actuator 100. The gap 104 is defined by two legs 106, each of which is configured to ride upon an inclined rib 108 located in a spring chamber 110 defined in the handpiece housing 40. Opposite the gap 104, the spring 102 includes an opening 112 dimensioned to accommodate a lug formation 114 projecting from the actuator 100. In the preferred embodiment, the engagement between the lug formation 114 and the opening 112 is an interference fit, however it is contemplated that chemical adhesives, ultrasonic welding, insert molding or other known fastening technologies could be alternatively implemented. To achieve a locking engagement with the drive shaft element 18, the lug formation 114 is preferably dimensioned to matingly engage the transverse throughbore of the locking formation 62.

When the user needs to lock the drive shaft element 18 from axial rotation, the actuator 100 is depressed radially relative to the handpiece housing 40 with sufficient force to overcome the radial biasing force generated by the spring 102. With the lug formation 114 engaged in the locking formation 62, the drive shaft element 18 cannot rotate, facilitating the insertion or removal of the working attachment 48 as is known in the art. The user maintains a gripping force on the actuator 100 which preserves this locking condition, until the locked condition is no longer required. Upon release of the actuator 100, the spring 102 exerts a radial biasing force against the actuator, pushing it out of engagement and into the rest position depicted in FIG. 3. It is contemplated that the number and configuration of the actuator 100 and the locking formation 62 may vary to suit the application.

In the preferred embodiment, the locking actuator 100 is located on the handpiece housing 40 approximately midway between the ends 38, 42 and is surrounded by a molded grip-enhancing rib fence 116, which also facilitates location of the actuator 100 when the operator is concentrating on changing the working attachment 48. It is also preferred that the handpiece housing 40 be provided with a relatively resilient outer layer 118 for further facilitating the gripping of the handpiece 42 during operation. It is also contemplated that the exact configuration and number of the rib fence 116 and the outer layer 118 may vary to suit the application.

While a particular embodiment of the rotary tool flex shaft with lock pin and end cap has been described herein, it will be appreciated by those skilled in the art that changes and modifications may be made thereto without departing from the invention in its broader aspects and as set forth in the following claims.

What is claimed is:

1. A handpiece for a rotary tool including a flexible power transmission shaft configured for connection at one end to the rotary tool, and at the other end to said handpiece, at least one locking formation affixed to the shaft, said handpiece comprising:

a housing having a first end for receiving the power transmission shaft, and a second end configured for accommodating a working attachment, said housing defining a central throughbore for rotatably receiving the flexible shaft;

at least one locking actuator disposed in said housing for releasable engagement with the at least one locking formation; and said handpiece being provided with a biasing force for biasing said at least one actuator out of engagement with the at least one locking formation, said at least one locking actuator being configured so that a user-applied force on said at least one actuator overcomes said biasing force to enable locking engagement between said at least one actuator and the at least one locking formation;

wherein said housing defines a chamber, and said biasing force is provided by a spring disposed in said chamber for exerting a radial biasing force against said at least one actuator; and wherein said actuator is configured for radial depression of said spring for temporarily locking said at least one locking formation.

2. The handpiece of claim 1 wherein said at least one actuator is engaged on said housing approximately midway between said first and second ends.

3. The handpiece of claim 1 wherein said biasing force is provided by a spring disposed between said at least one actuator and said at least one locking formation.

4. The handpiece of claim 1 wherein said at least one actuator is configured to extend radially from said housing and is at least partially surrounded by at least one gripping formation.

5. The handpiece of claim 4 wherein said at least one gripping formation is at least one rib fence.

6. The handpiece of claim 1 further including an attachment formation at said second end for receiving an endcap.

7. The handpiece of claim 6 further including an endcap configured for engagement upon said attachment formation, said endcap having a flared outer end.

8. The handpiece of claim 6 wherein said attachment formation is configured so that upon removal of said endcap, said attachment formation can receive a supplemental attachment.

9. The handpiece of claim 6 further including an end cap configured for attachment to said attachment formation so that said an end portion of said shaft extends past an outer end of said end cap.

10. The handpiece of claim 9 wherein said outer end of said end cap is flared.

11. A handpiece for a rotary tool including a flexible power transmission shaft configured for connection at one end to the rotary tool, and at the other end to said handpiece, comprising:

a housing having a first end for receiving the power transmission shaft, and a second end configured for accommodating a working attachment, said housing defining a central throughbore for rotatably receiving at least a portion of the flexible shaft wherein the flexible shaft has a collet nut affixed to a free end, an attachment formation at said second end configured for receiving an endcap;

said attachment formation is configured to circumscribe at least a portion of said collet nut;

an endcap configured for engagement upon said attachment formation;

and at least one locking formation affixed to the shaft within said throughbore, at least one locking actuator disposed in said housing for releasable engagement with said at least one locking formation, and said at least one actuator being provided with a biasing force for biasing said at least one actuator out of engagement with said locking formation, said at least one locking actuator being configured so that a user-applied force on said at least one actuator overcomes said biasing force to enable locking engagement between said at least one actuator and said at least one locking formation.

12. The handpiece of claim 11 wherein said endcap has a flared outer end.

13. The handpiece of claim 11 wherein said endcap is configured for attachment to said attachment formation so that said an end portion of said collet nut extends past an outer end of said end cap.

14. The handpiece of claim 11 wherein said locking actuator is radially reciprocable in said housing.

* * * * *